United States Patent
Powell

[19]

[11] Patent Number: 6,167,320

[45] Date of Patent: Dec. 26, 2000

[54] SYSTEM FOR CONTROL AND RESOURCE ALLOCATION FOR THE MANUFACTURING OF A PRODUCT

[76] Inventor: Roger A. Powell, 1740 Hollins Rd., Bensalem, Pa. 19020

[21] Appl. No.: 09/261,834

[22] Filed: Mar. 3, 1999

[51] Int. Cl.$^7$ .................................................. G05F 19/00
[52] U.S. Cl. ........................ 700/95; 700/36; 700/97; 700/99; 700/100; 700/102; 700/108
[58] Field of Search ................... 700/36, 97, 99, 700/100, 101, 102, 104, 108

[56] References Cited

U.S. PATENT DOCUMENTS

| | | | |
|---|---|---|---|
| 4,089,056 | 5/1978 | Barna et al. | 700/108 |
| 4,208,712 | 6/1980 | Deustch | 700/97 |
| 4,517,637 | 5/1985 | Cassell | 700/2 |
| 4,648,023 | 3/1987 | Powell | 700/36 |
| 4,796,194 | 1/1989 | Atherton | 700/99 |
| 4,827,423 | 5/1989 | Beasley et al. | 700/97 |
| 4,912,624 | 3/1990 | Harth et al. | 700/36 |
| 5,105,362 | 4/1992 | Kotani | 700/108 |
| 5,128,860 | 7/1992 | Chapman | 700/108 |
| 5,241,465 | 8/1993 | Oba et al. | 700/100 |
| 5,249,120 | 9/1993 | Foley et al. | 700/108 |
| 5,291,397 | 3/1994 | Powell | 700/108 |

*Primary Examiner*—Paul P. Gordon
*Assistant Examiner*—Ramesh Patel

[57] ABSTRACT

A control system for the production of a product or for a project. A primary project control computer oversees a plurality of secondary computers which manage each activity in the project. The system uses baseline schedule dates and measures variances to these dates. Resources are allocated based on the variances to minimize time and cost. Activity variance goals are individually assigned to each activity which is an improvement over the previous project-wide single goal method. An individual additional cost threshold may also be assigned to each activity.

17 Claims, 5 Drawing Sheets

SYSTEM FOR CONTROL AND RESOURCE ALLOCATION FOR THE MANUFACTURING OF A PRODUCT

BACKGROUND

This invention is directed to a control system for the manufacture of a product. The control system of this invention has the capability of rapid information processing and decision-making, minimizing production cycle time, efficiently allocating resources, and minimizing excess costs.

In the production of products, the work effort is a sequence of activities. The proper control of these activities is as important to the efficient transformation of the product from its initial state into its finished state as are the individual activities themselves. Just as an improvement in each activity can improve the production rate, an improvement in the control of the production process can produce a similar reduction in total cost and the elapsed time of production. In the production of any product, the costs of idle waiting time, penalties of late deliveries, unjustified expediting costs, and the costs of excess inventories must be minimized.

One system that has addressed this problem is the Critical Path Method(CPM), in which a network of activities is created that represents the sequence of activities and the interdependencies of the activities in the particular production process. A variation on this basic method is Project Evaluation and Review Technique (PERT) which uses multiple estimates of time durations to provide a probabilistic estimate. These systems are available as computer software. To use these systems, the networks are analyzed to find the critical path, i.e., the path that is, in effect, the longest duration, and which determines the final completion date.

A major inherent problem of these systems is that new information must be evaluated by serial searching; each new bit of information must be entered and the computer program run to determine the effect on the completion date. Further, to evaluate the effect of several potential changes, all combinations of the changes must be entered and individually run. This is a considerable expense in time and money on a large project. Also, near critical items which may become critical if they experience a slight delay, are not identified. Further, all the information must be entered into one large computer program thereby requiring centralized processing and decision making. Although valuable, these systems do not provide an easy and timely visibility into the critical items and their degree of impact. Also, these systems do not offer a means to balance resources in order to minimize the time and cost of a project. These systems do not support Enterprise-Wide Project Management(EWPM) because the centralized decision making makes them intractable and they offer no methodology for optimization.

U.S. Pat. Nos. 4,648,023 and 5,291,397 describe a new method of centralized analysis and control using a central computer. U.S. Pat. Nos. 4,648,023 and 5,291,397 are incorporated by reference. This method described in these patents does not incorporate the advantage of decentralizing the analysis and decision-making to the local level to empower the local manager. Since the local manager is the expert in utilizing his resources, it would be advantageous to provide him with the tools and information to optimize the use of these resources.

OBJECTS OF THE INVENTION

One object of this invention is to provide a method to control a process composed of interrelated activities. Another object of this invention is to provide a computer or computer-network based control system for manufacturing a product that provides a means for minimizing communication to a few easily understood descriptors and decentralizing the analysis and decision making to the local level. Another object is to allow searching the manufacturing process in parallel for critical items. Another object is to provide information for real time responses to inquires about the impact of changes in the availability of an item at the local level. Another object is to provide a means to monitor the progress of a manufacturing sequence of activities. Another object is to provide a control system that provides the basis for optimal distribution of resources within projects and across projects at the local level. Another object is to identify conflicts in the resource usage at the local level of a project. Although the description of the invention is based on the manufacture of a product, it may be used to control any sequence of interrelated activities.

Further objects and advantages will by apparent upon reading the following description in conjunction with the drawings.

SUMMARY OF THE INVENTION

The control system is composed of a primary computer of the project manager and a number of secondary computers linked in a computer network. This project manager, on his primary computer, enters a network of manufacturing activities, enters time duration estimates for each activity, enters a desired project completion date, and calculates baseline schedule dates for the beginning and end of each activity. This baseline schedule date data set is used as a constant reference against which all supporting external element/component/resource availability dates and actual and predicted internal progress is measured. This information is transferred to the secondary computers via the computer network. The principal control variable is a measure of the projected or actual deviation from the baseline schedule dates and is called the variance or variance value. The variance value for each element and activity is calculated by the secondary computers and transmitted to the primary computer via the computer network. The variance value is used to determine the predicted final completion date, allocate resources, and to optimally organize work in a queue. The use of variance values allows the parallel processing of information, since the baseline schedule has been constructed on a Just-In-Time(JIT) basis, without imbedded float (waiting) time, each variance value is a one-to-one predictor of the impact on the final completion date.

A BRIEF DESCRIPTION OF THE DRAWINGS

FIG. 2 shows a connection diagram of the control system showing the project manager's central primary computer and four secondary local computers each of which belongs to an activity manager. All of the computers are interconnected by computer network cabling or the like.

DETAILED DESCRIPTION OF THE PREFERRED EMBODIMENT

To facilitate the description of the invention, it is worthwhile to define some conventions solely for this purpose. These conventions are somewhat arbitrary and should not be construed as limiting to the generality of the invention. For the purpose of this description:

A. Time is measured in working days.

B. Each working day is assigned a sequential number called the "date" representing the working calendar date or a point in time: the number increases with later calendar time.

C. The variance value or variance is the amount of time that a component or an activity in the network is early or late with respect to its baseline schedule date or requirement date. Algebraically, the variance value is the estimated availability date(or actual date) minus the requirement date. If the availability date is earlier than the requirement date, it will be numerically smaller that the requirement date, and the variance value will be a negative number. This indicates the potential for an early (or ahead of schedule) event. If the availability date is later than the requirement date, the variance value is positive, which predicts that the event will be late. The variance value is a measure of the amount of lateness of the availability of an element or of an event with respect to its baseline schedule date; the greater the variance algebraic value, the grater the amount of lateness.

D. Greater variance value is defined in the algebraic sense, meaning the most positive amount; i.e., positive 4(+4) is greater than negative 6(−6) and negative 2(−2) is greater than negative 5(−5)

E. The predicted date for an event or element availability is the baseline schedule date plus the greatest variance value. For example, if the baseline schedule date for an event is day 201 and the greatest variance value is +5, the predicted date is day 201 plus 5 days equal to day 206, or 5 days late. If the greatest variance value is −5, the predicted date is day 201 plus −5 to equal day 196, or 5 days early.

F. Contingency time is created by the predicted and/or actual start of an activity being before the baseline schedule date for the start of the activity. Contingency time allows delays in an activity to be absorbed without violating the activity's baseline schedule date and impacting the desired project completion date. The task of the activity manager is to create and maintain the most economically reasonable amount of contingency time possible by starting his activity early and finishing early, thereby passing on an amount of contingency time greater or equal to the amount he started with. The project manager's task is to manage the project resources to overcome losses of contingency time and defend the amount of contingency time available. As activities are completed, the risk of delays decreases. Therefore, the amount of contingency time required to maintain a given confidence level of on-time completion decreases. The contingency time is equal to the value of a negative variance: i.e., a variance of −3 indicates a potential contingency time of 3 days.

Figure 1:
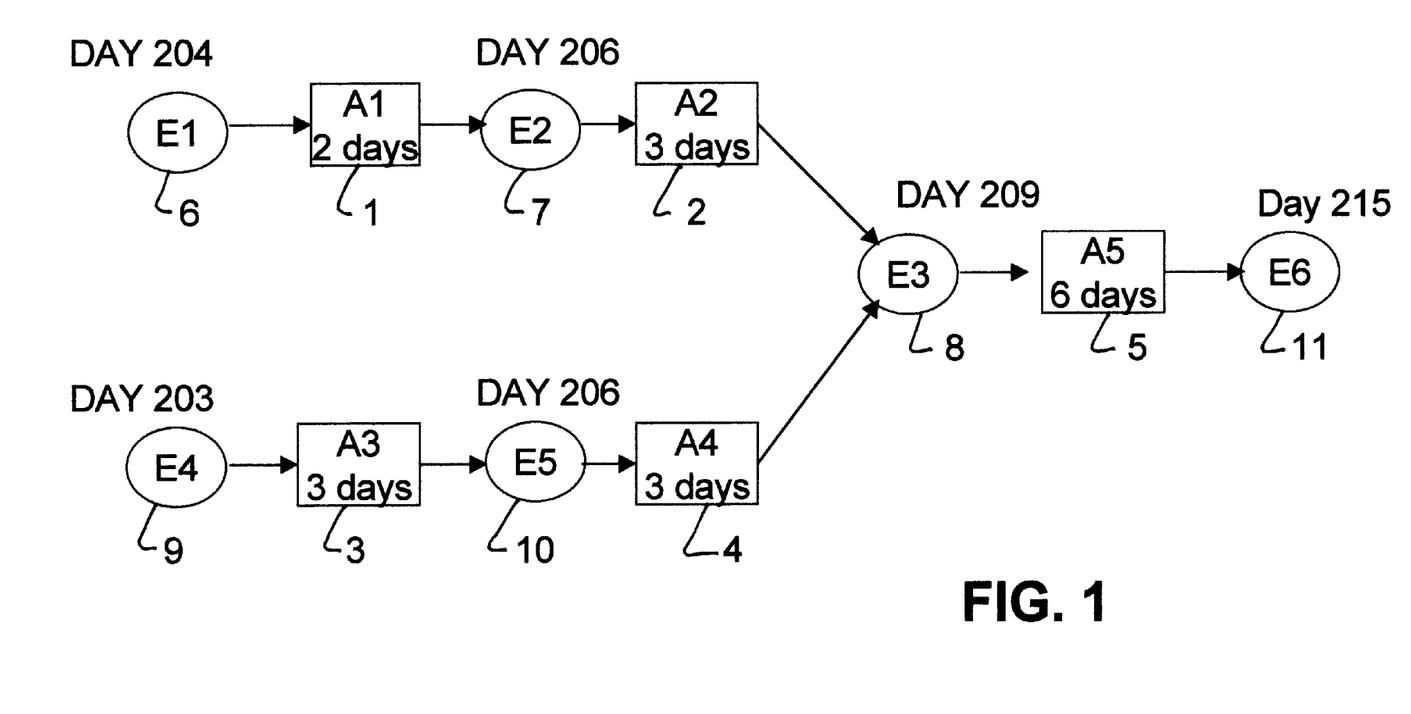
FIG. 1 shows a typical network of events and activities that describes the sequence of steps and interdependencies in the manufacture of a product. This network may represent a project that occurs once or that is a part of a continuing process.

In FIG. 1, in the manufacturing process of a product or a project, the time-consuming transformation activities may be defined as activities, 1, 2, 3, 4, 5 and each one is identified by the letter "A" and a numerical suffix; i.e., "A1," "A2," etc. At the beginning and the end of each activity, 1, 2, 3, 4, 5, there exists a state or condition that occurs at a moment of time and which is defined as an event, 6, 7, 8, 9, 10, 11; for example: "Activity A1 completed, Activity A2 ready to begin" is event E2, 7. Events 6, 7, 8, 9, 10, 11 are identified by the letter "E" and a numerical suffix: for example: "E1," "E2," etc. Typically, there are interdependencies of the time sequence of activities in the manufacturing process. For example, holes must be drilled and tapped in a part before bolts can be screwed in, or, activity A1 must be completed before activity A2 can begin. This may be a listing in a matrix or other format or it may be shown graphically as an interconnected network of activities.

FIG. 1 shows a network of activities 1, 2, 3, 4, 5 and events 6, 7, 8, 9, 10, 11 flowing from left to right. The interconnecting arrows show the direction of time and material flow, and flowing from left to right, and the interdependencies between the activities 1, 2, 3, 4, 5 and the events 6, 7, 8, 9, 10, 11. For example, activity A5, 5 cannot begin until event E3, 8, has occurred, which is "Activity A2 complete, Activity A4 complete, Activity A5 ready to begin." Within each activity block 1, 2, 3, 4, 5, is shown the estimated time duration of the activity. The estimate includes waiting in queue, machine time, and time to transport the work piece to the next workstation. The foregoing parallels the Critical Path Method (CPM) of network analysis except that CPM requires that the beginning events in each path be connected together in a singe node. A CPM network must be generated to include all of the activities(including engineering, purchasing, fabrication and assembly, etc.) for all the components required in the complete product. This can result in a very large network. As will be seen later, this invention can reduce the size and complexity of the network of activities significantly.

The next step is the assignment of baseline schedule dates to each event. The desired project completion date is assigned to the project completion event E6, 11 in FIG. 1. In this example, "day 215" is used. Each prior event is assigned its baseline schedule date by moving from right to left (backward with respect to time) and subtracting the time duration estimate of the intervening activity from the date of the event that follows that activity in time. For example, the date for E3, 8 equals the date for E6, 11, day 215, minus the duration of A5, 5, of 6 days to equal day 209. The resulting dates shown in FIG. 1 are the baseline schedule dates. The activities, their time sequence interdependencies, estimated durations and the desired project completion date may be entered into a primary computer, 20, shown in FIG. 2, as input by the project manager. The primary computer 20 may be a simple desktop personal computer or the like that are well known in the art. The primary computer 20 calculates the baseline schedule dates based on prior instructions. The baseline schedule date for the start of an activity is calculated by subtracting the duration of the activity from the baseline schedule date for the start of the following activity, beginning with the desired completion date. The baseline schedule date for the start of an activity is equal to the latest possible date the activity can start and satisfy the desired project completion date. Viewed another way, the amount of working days between the baseline schedule date for the start of an activity and the project desired completion date is equal to the longest contiguous sequence of activity durations between these two events. The resulting network of activities and a list of the events and their baseline schedule date are stored in the primary computer 20. The baseline schedule dates are communicated to the secondary computers 21 via the computer network. The secondary computers 21 may be simple desktop personal computers or the like.

The network of activities shown in FIG. 1 has no slack (or waiting) time embedded in the time flow. This is by design and is a major difference with the Critical Path Method (CPM). Any event that occurs later than its baseline schedule date will cause the project completion date to be equally late. Similarly, any forecast of an event being late with respect to the baseline schedule dates (having a positive variance value) is also a direct forecast of the lateness of the project completion date. This feature allows multiple changes or effects to be evaluated in parallel rather than sequentially as in CPM. The event with the greatest variance value will dominate all other events and determine the effect on the project completion date.

Figure 2:
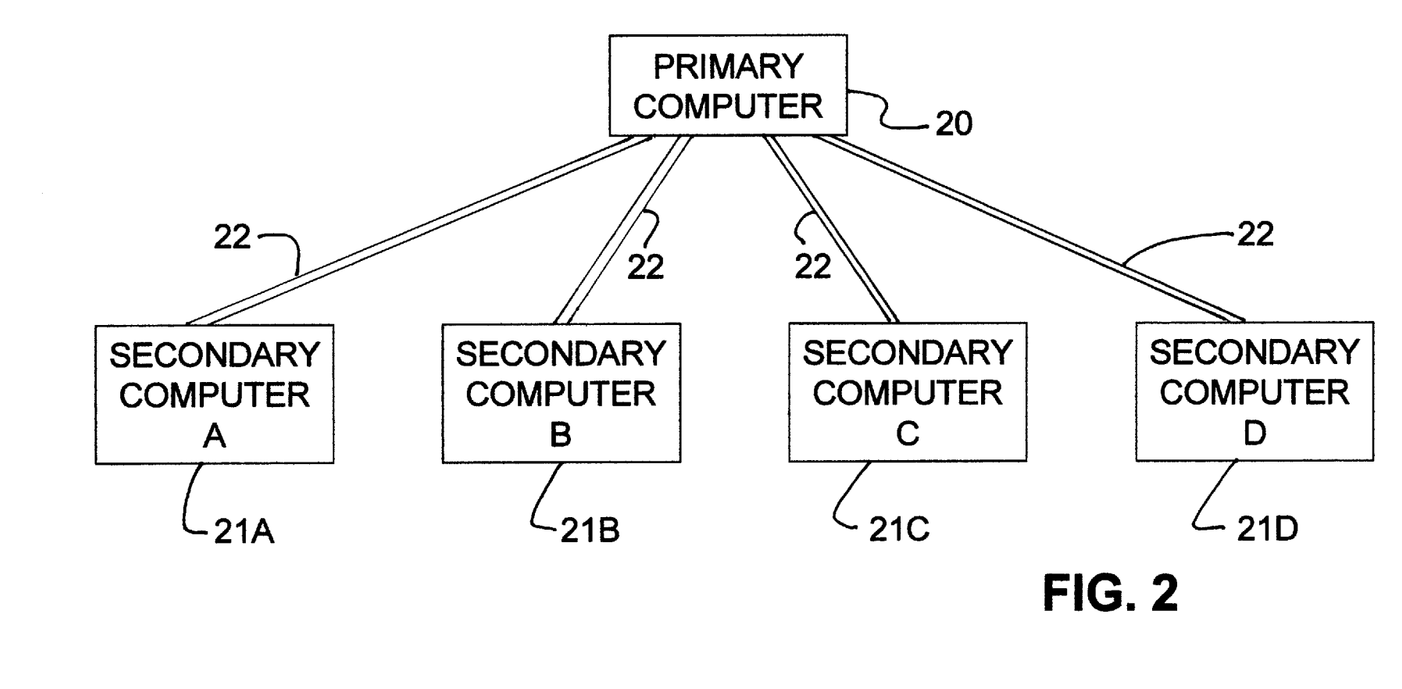

FIG. 2 shows an embodiment of the computer network used in the control system. The primary computer 20 is assigned to the project manager. It communicates with a number of secondary computers 21A, 21B, 21C, 21D which are assigned to the various activity managers. The computers are interconnected by the computer network that consists of cabling or the like 22 that interconnects the computers with one another. The cabling may be coaxial, fiber optic, or other means of communication and may include other hardware components such as network hubs or the like that are well known in the art. Communication over the network may be controlled by software within the primary and secondary computers and/or by a separate computer server. The computer network could be confined to one building or could be global by communicating over the Internet. The interconnection cabling shown is descriptive and arbitrary and should not be construed as limiting.

At this point is beneficial to describe the control system in two parts: the first part being the control of the external elements and the second part being the control of the internal activities. An external element is defined as an item that is required for an activity and that has not yet entered the network and is not being tracked internally as part of the network flow. An external element may be a component or a fastener that is assembled during the activity or a tool such as an assembly fixture that is only used during the activity, then put aside. An external element may be a specific labor skill or personnel. The ability to track external elements separately from the network reduces the network size significantly.

An activity manager is appointed for each activity. The activity manager can typically be the functional manager responsible for the activity area. The activity manager is provided with a secondary computer. The activity manager identifies all of the external elements that are required to begin the activity. In this example, these are given five digit code numbers and are entered and listed in the activity manager's secondary computer 2 for activity A2, as shown in Table 1, column 1. The starting event for activity A2 is E2 as shown in column 2. Column 3 shows the baseline schedule date for the beginning event, in this case, day 206. The activity manager collects information on the availability date for each external element and enters it in column 4. His computer calculates the variance value for each line item by subtracting the entries in column 4 from those in column 3, and shows it in column 5. Table 1 is example of a display of information as might be seen on the screen of the secondary computer. The external element that is the latest (having the largest variance value) will be the external constraint on the beginning of the activity. The beginning of the activity can also be constrained by the completion of the upstream activity A1, 1. But, this invention allows the constraints from activity A1, 1 to be evaluated independently. Before a project actually starts, there are no upstream constraints, and only the external elements are evaluated. In this case, shown in Table 1, the activity manager identifies element 91005 as the latest element with the largest variance value of −2. This is the dominant external element. The other elements with lessor variance values must wait after arriving until element 91005 arrives and the activity can start. The activity manager must improve the availability date of element 91005 in order to improve the activity start date. He can investigate whither resources can be diverted from the lessor variance value elements to element 91005 to improve its date. For example, if resources can be diverted from element 91009 (to give it a three-day later availability date of 200 and a new variance of −6) to element 91005 to improve its availability date by three days to 202 and reduce its variance to −4, this removes element 91005 as the activity constraint. The change to element 91009 has no effect since it continues to be dominated or overshadowed by element 91005. He can also question whether element 91005 is absolutely necessary at the beginning of the activity. If it is not, he can revise the requirement date to be later and recalculate the variance value. For example, if element 91005 wasn't necessary until the second day of the activity, he could revise the requirement date to 207 and the variance value would be recalculated to −3. Now, since element 91005 and element 91001 both have variance values of −3, both must be improved to gain further improvement in the start date.

The activity manager can relist the external elements in order of decreasing variance as shown in Table 2 and gather the cost per day to improve each element which is shown in column 6. Frequently, it, can be surprisingly inexpensive to improve availability dates early in a project. For example, the availability of element 91005 can be improved by 3 days by spending $90 (or $30 per day) for air freight shipping rather than ground freight. The availability of elements 91001 and 91007 can be improved by authorizing overtime. As the activity manager moves down the column, he finds that elements 91002 and 91006 have significantly higher costs to improve. Based on the contractual penalties for being late and his confidence level, the activity manager decides to only improve the first three items so that they have new variances of −5. This costs a total of $350 dollars and allows him to start the activity three days earlier and have a contingency time of 5 days. Since the latest elements dominate the start of the activity, it is readily apparent that expending additional funds on elements having variances of −5 or less will have no direct effect on the start of the activity and would be wasted. This simple listing provides the basis to direct additional resources to external elements that will provide the maximum return and allows optimization of the time/cost tradeoff The activity manager transmits the largest external element activity variance value from his computer 21 over the network to the project manager's computer 22. This variance value is the predictor of how early the activity will start and finish due to the external element constraints.

The project manager collects the input activity variance values from each activity manager's secondary computer 21 over the computer network in his primary computer 20 and this information is arranged in a list as shown in Table 3. Table 3 is an example of the display of information as might be shown on the screen of the primary computer 20. The first column shows the activities. The second column shows the beginning event for each activity. The third column shows the baseline schedule dates for each event. The fourth column shows the reported external element variance value for each activity received from the activity managers. The variance of −5 for activity A2 shown in Table 2 is carried over to this table. Similarly, external element variances for the other activities as provided by the other activity managers are entered. The project manager then scans the variance values to find the largest entry. In this example, it is activity A5 with a variance value of −2. This is the dominant activity that will determine the project completion date. Since there is no embedded waiting time (or slack time) in the baseline schedule, there is a one-to-one relationship between the dominant activity and its prediction of the project completion date. Since the dominant activity has a variance of −2 (2 days early), it predicts that the project completion date will be two days early. In other words, there is a prediction of two days contingency time at the project completion date due to external constraints. The fifth column shows the dominant internal constraint on the beginning of each activity. This is the largest external element variance on the start of any predecessor activity. For example, since activity A1 has no predecessor activity, there is no upstream constraint. Therefore, the start of activity A1 is only constrained by the external elements with a variance value of −4 (4 days early). Its predicted start date will be its baseline schedule date of day 204 plus its variance of −4 equal to day 200. This shown in column 6. This will allow activity A1 to finish 4 days early. The following activity, A2, cannot start until activity A1 is complete, which is predicted to be 4 days early. This is later (a larger variance) and therefore dominates the activity A2 external element constraint of −5. Therefore, the predicted start of activity A2 is its baseline schedule date of day 206 plus the internal variance of −4 equal to day 202. One day of external element contingency time of activity A2 with a variance of −5 will be lost because the activity start must wait for the predecessor activity A1 with a variance of −4 to be completed. The project manager has several options to balance the variances and costs: additional funds can be expended to expedite the critical external elements in activity A1 to increase the a variance to −5 to match that of activity A2, or, the additional funds expended on external elements in activity A2 can be reduced to allow its variance to decrease to −4, or the present condition can be maintained which allows one day of additional continency time to receive the external elements of activity A2. This is a quantifiable tool that the project manager can use to balance contingency time and cost. The predicted occurrence entries of column 6 are equal to the baseline schedule dates of column 3 plus the larger of column 4 or column 5.

Figure 3:
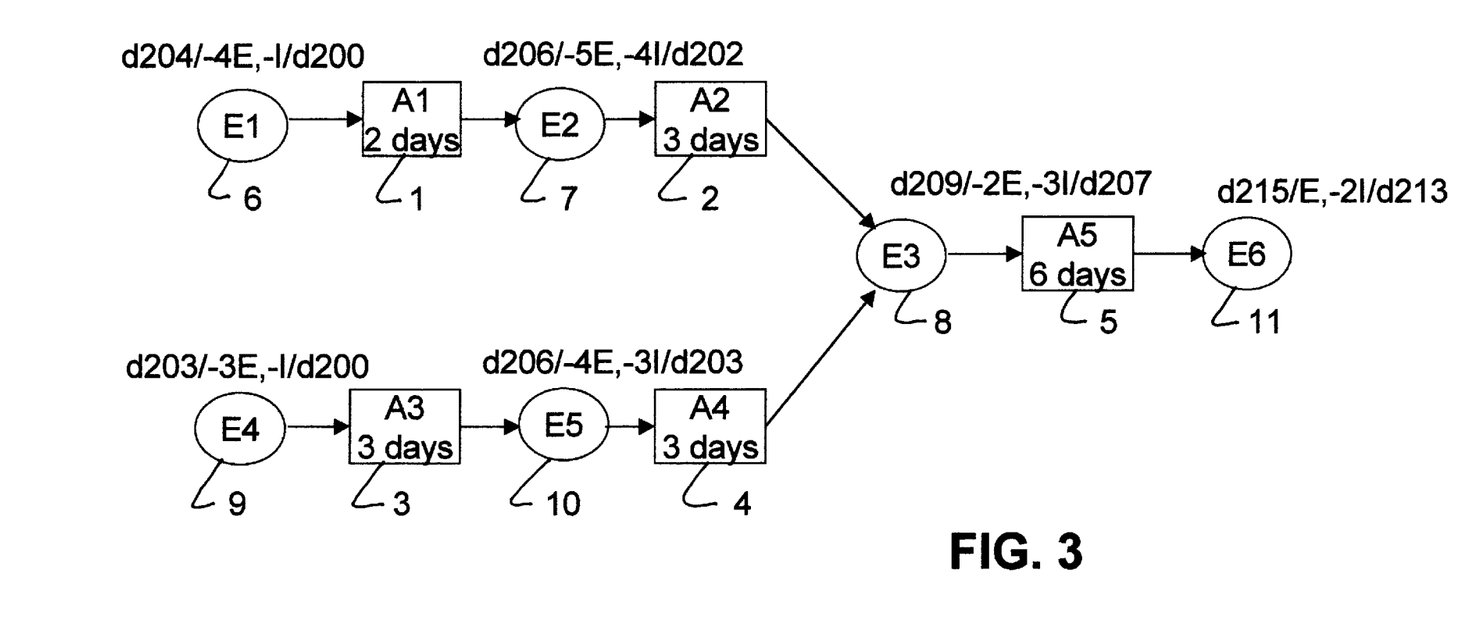
FIG. 3 shows the network of events and activities with variance values.

FIG. 3 graphically shows the data in Table 3. Adjacent to each event that represents the finish of one activity and the start of the next activity is an entry in the following format: "baseline schedule dates"/"external variance", "internal variance"/"predicted occurrence." The external variance is followed by an "E" and the internal variance is followed by an "I." If the letter "E" or "I" appear without any variance value, there is no element or predecessor activity in that category and therefore no constraint. For example, for event E2, the entry is d206/−5E, −4/d202. This reads: the baseline schedule dates is day 206; the external variance is −5; the internal variance is −4; the predicted occurrence is day 202. Since the internal variance of −4 is greater than the external variance of −5, the internal variance will dominate, and the predicted occurrence will be 4 days early of the baseline schedule dates. Looking at the external variance and internal variance identifies the constraint to starting the activity and the degree to which contingency time is lost. Ideally, the external variance and internal variance would be equal indicating that the start of an activity would not have to wait for either internal or external constraints and no potential contingency time would be lost. If there is a significant disparity between the external variance and internal variance, the project manager should investigate improving the dominant variance, since this indicates an opportunity to maintain contingency time. For example, if an activity has an external variance of −3 and an internal variance of −6, the external variance/constraint will dominate and the activity start will have to wait for the latest external element. This will be a loss of 3 days of contingency time. The project manager can contact the activity manager and authorize the allocation of additional funds to improve the availability of the latest external elements and increase the variance to −6. After this review and balancing effort, the project manager transmits an Activity Variance Goal (AVG) to each activity manager for his activity. This is the external element variance value that the activity manager is expected to meet at the start of his activity and the finish of his activity, and is equal to the contingency time that he is to pass on to the next activity. The project manager can also transmit an additional cost threshold of additional funds the activity manager may spend to maintain the AVG without prior approval of the project manager. As the activity manager manages the availability of the external elements, he only needs to be concerned with those elements that are predicted to exceed the AVG, and he needs to communicate new information only when the cost to maintain the AVG exceeds his additional cost threshold. This minimizes the communication between the activity manager and the project manager to only that which is necessary.

The activity manager for an activity for one project may also be the activity manager for another activity in the same project and/or the activity manager for another activity for another project. This is the case for a functional manager providing either engineering, fabrication, or assembly for several projects. This method provides a tool to prioritize his work and resources. He can estimate the beginning and the completion of each activity from his external elements list and calculate its variance value with respect to the activity's baseline schedule date. He needs only to compare these variance values to the activity AVG to determine if the activity is maintaining the continency time. Since each project manager is monitoring his project and reflecting its status in each activity's AVG, the activity manager has an up-to-the-minute status measurement. Now, he can prioritize his resources to not exceed the AVG for each respective activity, or raise an early warning if it cannot be done without exceeding his additional cost threshold. He can also look at his resource loadings on a time line. Each activity must begin and end no later than its baseline schedule date plus the AVG. This gives him an actual date for these events. He can determine the possibility of starting an activity earlier by checking the variance values to avoid a conflict in resource usage. He can consider a more complex pattern of usage of resources since he is typically the expert in these resources. There are numerous ways of depicting this information graphically on the display screen of a secondary computer.

The second portion of the control system monitors the internal activities that occur in the activity network. The activity manager reports to the project manager through the computer communication system when his activity begins by transmitting the appropriate variance value. He also estimates the completion of the activity using the variance value. He reports its actual completion when it occurs in terms of its variance value. Of course, all of the variance values are referenced to the appropriate baseline schedule date as previously described. The project manager can accumulate this information and manage it by exception by looking for the largest variance value or any variance value predictions that exceed the respective activity's AVG. If an activity variance exceeds or is predicted to exceed its AVG, the project manager can investigate the cost to recover the lost time and then determine if the additional costs are justified. If the additional costs are not justified, he can accept the loss of some contingency time and increase the AVG values for subsequent activities to be commensurate with it. Conversely, if the activity completions are ahead of schedule, he can decrease the AVG values for subsequent activities to increase contingency time. This management technique of using variance values applies additional resources only as needed to be beneficial to the completion date.

Figure 4:
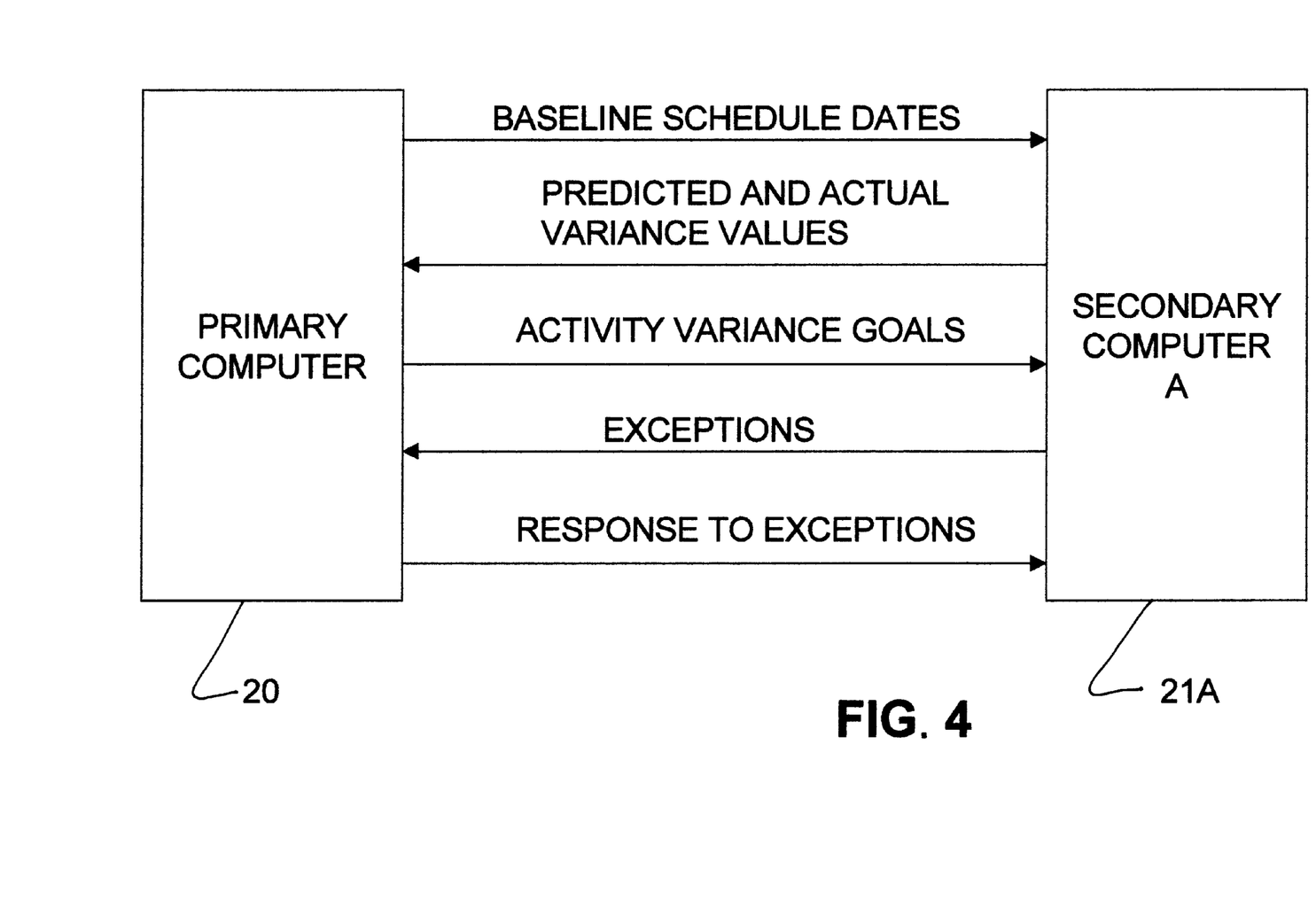
FIG. 4 shows the information flow between the primary computer of the project manager and one secondary computer of an activity manager.

FIG. 4 shows the information flow between the project manager's primary computer 20 and one of the secondary computers 21A belonging to an activity manager. The baseline schedule information goes from the primary computer to the secondary computer. Predicted and actual variance values go from the secondary computer to the primary computer. The Activity Variance Goals (AVG) values go from the primary computer to the secondary computer. Exceptions that violate the AVG or cost thresholds go from the secondary computer to the primary computer, and responses to the exceptions go from the primary computer to the secondary computer. All of the described information flow can be via the computer network.

Figure 5:
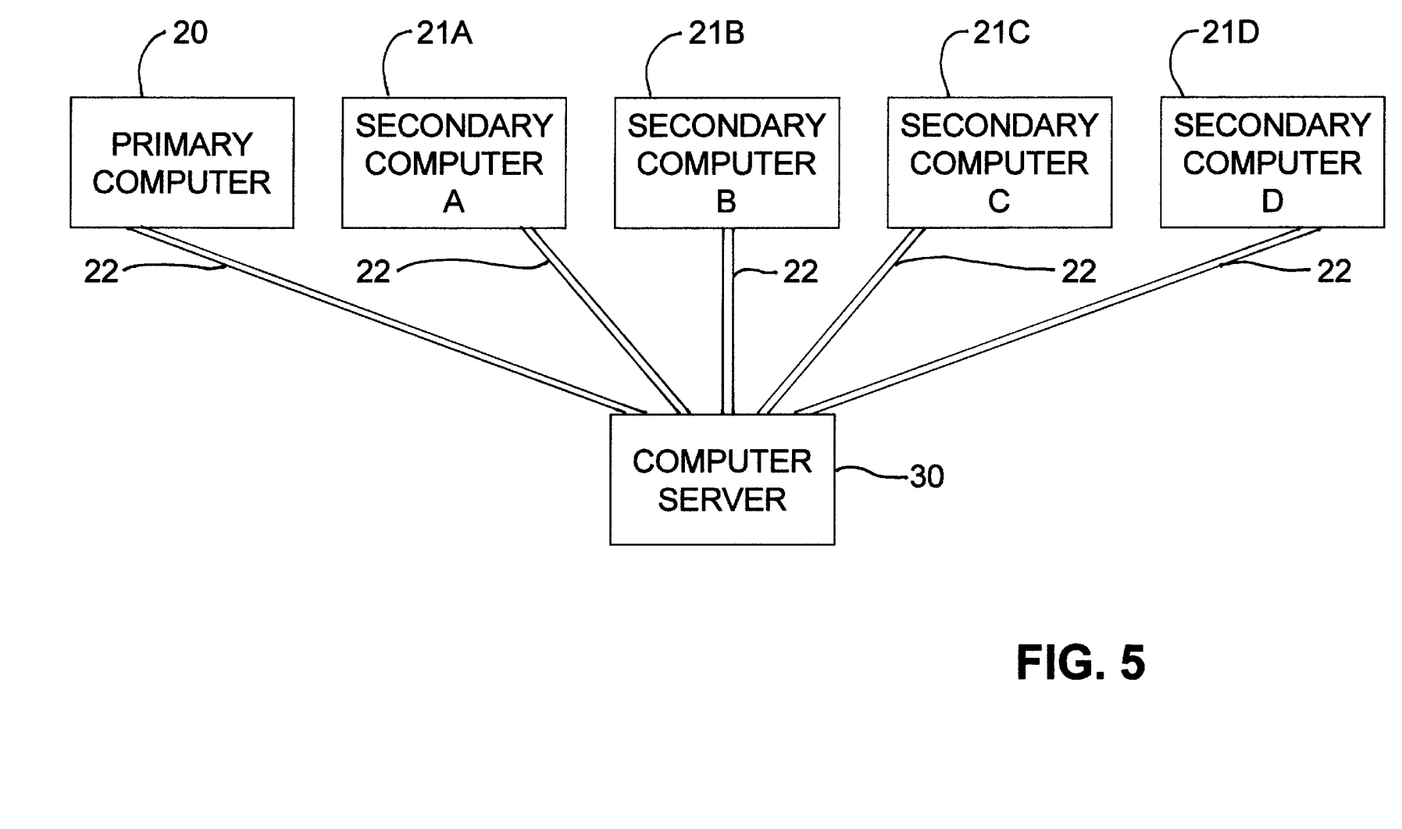
FIG. 5 shows a connection diagram of the system using a client/server computer network arrangement.

FIG. 5 shows an alternative embodiment of the control system. The information is communicated to and stored by a computer network server 30. The primary computer 20 and the secondary computers 21 are clients of the computer network server in a client/server computer network. The primary computer 20 and secondary computers 21 may be standard desktop personal computers that are well known in the art. The computer network server 30 is a digital computer usually with larger speed and storage capacity than the primary computer or secondary computers and is also well known in the art and is offered by a number of manufacturers. The project manager is assigned the primary computer 20 into which he enters the activities, their time sequence interdependencies, and the desired completion date in the same manner as previously described. In the same manner as previously described, the primary computer 20 calculates the baseline schedule dates. The resulting network, events, activities, and baseline schedule dates are communicated through interconnecting cable 22 to the computer network server 30. The computer network server 30 stores this information at a known location in its storage media. An activity manager's secondary computer 21 may request this information from the computer network server 30 through the interconnecting cable 22. The computer network server 30 responds by transmitting the baseline schedule dates to the requesting secondary computer 21 through the interconnecting cable 22. The interconnecting cable may be coaxial cable, fiber optic cable, broadcast signal, the Internet, or the like, also it may contain other hardware elements. The interconnecting cable shown is a descriptive example and should not be construed as limiting. An activity manager's secondary computer 21 receives the activity manager's inputs as previously described and the baseline schedule dates from the computer network server 30 to create the example display represented by Table 1. The activity manager's secondary computer 21 communicates the activity's variance value to the computer network server 30 which stores them and/or transmits them to the project manager's primary computer 20 for the creation of the example display represented by Table 3. Similarly, the project manager's primary computer 20 will communicate the AVG via the computer network server 30 and interconnecting cabling to all the secondary computers 21.

The information flow for the client/server computer network shown in FIG. 5 is essentially the same as in FIG. 4 but each flow path between the primary computer 20 and the secondary computers 21 is routed through the computer network server 30 where the information is also stored.

Another embodiment uses a central computer connected by a computer network to terminals (displays and keyboard) having little or no computing power. The project manager's primary computer would become the primary terminal in this embodiment for the previously described input data and the calculations and information storage would be performed in the central computer. The baseline schedule dates would be communicated to the activity managers' secondary terminals. The activity managers would perform the same functions on their secondary terminals, only the calculations and information storage would be performed by the central computer. The operational interfaces between the project manager and the activity managers with their terminals would be the same as previously described. The benefits of the control system as in the previous embodiments would be realized since the central computer would be operating independently to serve the needs of each user.

Another embodiment of the control system establishes direct communication between secondary computers 21 to provide updated internal variance information from upstream (earlier) or downstream (later) activities. Therefore, each activity manager would receive the latest variance information directly from the activity managers of earlier predecessor activities via the computer network without the intervention of the project manager. This would be accomplished in either the configurations shown in FIG. 3 or FIG. 5 or in the central computer with multiple terminals previously described. For example, for activity A5, the information would be reported as shown in Table 4 on the activity manager's computer 21 screen. The A5 activity manager can see that the maximum variance −3 from activity A3 will dominate the predicted upstream internal constraint and he can use this value as his AVG without reducing the contingency time that he passes on to the next activity. Similarly, the activity manager could see if there were large downstream delays that would make his additional spending of funds fruitless. As the project progresses, the actual event dates will be entered and communicated so that the AVGs can reflect the new information.

Another embodiment uses a single computer that performs all the storage and computational functions of the previously described primary and secondary computers and a single display that presents the information previously described as being presented by the primary and secondary computers.

Other embodiments of the invention will be apparent to those skilled in the art from a consideration of the specification or practice of the invention disclosed herein. It is intended that the specification and examples are exemplary only and the true scope and spirit of the invention being indicated by the following claims.

TABLE 1

External Element List for Activity A2

| 1<br>External Element<br>Number | 2<br>Event Number | 3<br>Baseline Schedule Date | 4<br>Availability Date | 5<br>External Element<br>Variance |
|---|---|---|---|---|
| 91001 | E2 | 206 | 203 | −3 |
| 91002 | E2 | 206 | 201 | −5 |
| 91003 | E2 | 206 | 200 | −6 |
| 91004 | E2 | 206 | 199 | −7 |
| 91005 | E2 | 206 | 204 | −2 |
| 91006 | E2 | 206 | 201 | −5 |
| 91007 | E2 | 206 | 202 | −4 |
| 91008 | E2 | 206 | 200 | −6 |
| 91009 | E2 | 206 | 197 | −9 |
| 91010 | E2 | 206 | 198 | −8 |

TABLE 2

External Element List with Cost for Activity A2

| 1<br>External<br>Element<br>Number | 2<br>Event Number | 3<br>Baseline<br>Schedule Date | 4<br>Availablty Date | 5<br>Variance | 6<br>Cost to<br>Improve<br>(per day) | 7<br>Funds Spent | 8<br>New Availablty<br>Date | 9<br>New Variance |
|---|---|---|---|---|---|---|---|---|
| 91005 | E2 | 206 | 204 | −2 | $30 | $90 | 201 | −5 |
| 91001 | E2 | 206 | 203 | −3 | 100 | 200 | 201 | −5 |
| 91007 | E2 | 206 | 202 | −4 | 50 | 50 | 201 | −5 |
| 91002 | E2 | 206 | 201 | −5 | 1000 | 0 | 201 | −5 |
| 91006 | E2 | 206 | 201 | −5 | 2000 | 0 | 201 | −5 |
| 91003 | E2 | 206 | 200 | −6 | 100 | 0 | 200 | −6 |
| 91008 | E2 | 206 | 200 | −6 | 200 | 0 | 200 | −6 |
| 91004 | E2 | 206 | 199 | −7 | 40 | 0 | 199 | −7 |
| 91010 | E2 | 206 | 198 | −8 | 60 | 0 | 198 | −8 |
| 91009 | E2 | 206 | 197 | −9 | 50 | 0 | 197 | −9 |

TABLE 3

Activity Variance List

| 1<br>Activity | 2<br>Starting Event | 3<br>Baseline Schedule Event | 4<br>External Element Activity Variance | 5<br>Upstream Constraining Variance | 6<br>Predicted Start Date |
|---|---|---|---|---|---|
| A1 | E1 | 204 | −4 | NA | 200 |
| A2 | E2 | 206 | −5 | −4 (E1) | 202 |
| A3 | E4 | 203 | −3 | NA | 200 |
| A4 | E5 | 206 | −4 | −3 (E4) | 203 |
| A5 | E3 | 209 | −2 | −3 (E3) | 207 |
| Completion | E6 | 215 |  | −2 (E3) | 213 |

TABLE 4

Internal Variance of Activity A5

| 1<br>Activity | 2<br>Starting Event | 3<br>Baseline Schedule Date | 4<br>Internal Variance |
|---|---|---|---|
| A1 | E1 | 204 | −4 |
| A2 | E2 | 206 | −5 |
| A3 | E4 | 203 | −3 |
| A4 | E5 | 206 | −4 |

I claim:

1. A system for the control of the production of a product, comprising:

a primary computer, said primary computer accepting the following inputs: a list of activities in said production, interdependencies of the time sequence of said activities, time duration estimates of said activities, and a desired completion date of said production, said primary computer calculating a baseline schedule date for the start of each said activity, said baseline schedule date for the start of each activity being calculated by subtracting the duration of said activity from the baseline schedule date for the start of the following activity, said desired completion date being the last baseline schedule date, said primary computer storing said baseline schedule dates, said primary computer communicating a baseline schedule date to a secondary computer, said secondary computer accepting the following inputs: designations of external elements required to start an activity and an availability date for each of said external elements, said secondary computer calculating a variance value for each of said external elements, said variance value being equal to the amount of lateness of said availability date with respect to said baseline schedule date for said activity, and said secondary computer identifying the external element having the largest variance value for said activity, said secondary computer communicating the largest external element variance value for said activity to said primary computer, means for communicating between said primary computer and said secondary computer, said primary computer transmitting to said secondary computer an activity variance goal for said activity.

2. A system for the control of the production of a product as recited in claim 1, further comprising allocation means for redistributing resources to said external element having the greatest variance value thereby representing the greatest amount of lateness.

3. A system for the control of the production of a product as recited in claim 1, further comprising said production of a product, said production process applying resources to transform an article from an initial state into a different state.

4. A system for the control of the production of a product as recited in claim 1, wherein said primary computer determines a largest variance value for all said activities and displays said largest variance value for all said activities.

5. A system for the control of the production of a product as recited in claim 1, wherein said secondary computer compares updated revisions of variance values of said external elements for said activity to an activity variance goal received from said primary computer, and said secondary computer displays updated revisions of variance values that exceed said activity variance goal.

6. A system for the control of the production of a product as recited in claim 1, wherein said secondary computer accepts as input an actual date of completion of an activity, said secondary computer calculates a variance value for said actual completion, said variance value being equal to the degree of lateness of said actual completion date with respect to said baseline schedule date for said completion of said activity, said secondary computer communicating said variance value to said primary computer using means for communicating.

7. A system for the control of the production of a product as recited in claim 1, wherein primary computer transmits an additional cost threshold for satisfying said activity variance goal for said activity to said secondary computer.

8. A system for the control of the production of a product, comprising:

a primary computer, said primary computer accepting the following inputs: a list of activities in said production, interdependencies of the time sequence of said activities, time duration estimates of said activities, and a desired completion date of said process, said primary computer calculating a baseline schedule date for the start of each said activity, said baseline schedule date for the start of each activity being calculated by subtracting the duration of said activity from the baseline schedule date for the start of the following activity, said desired completion date being the last baseline schedule date, said primary computer transmitting said baseline schedule dates to a computer network server for storage, a secondary computer, said secondary computer accepting the following inputs: designations of external elements required to start an activity and an availability date for each of said external elements, said secondary computer retrieving the baseline schedule date for said activity from said computer network server, said secondary computer calculating a variance value for each of said external elements, said variance value being equal to the amount of lateness of said availability date with respect to said baseline schedule date for said activity, and said secondary computer identifying the external element having the largest variance value for said activity, said secondary computer communicating the largest external element variance value for said activity to said computer network server for storage, said computer network server receiving data from said primary computer and from said secondary computer, and providing storage locations for said data means for interconnecting said primary computer, said secondary computer, and said computer network server, said means for interconnecting being capable of communicating computer-readable data signals, said primary computer communicating an activity variance goal to said secondary computer for said activity.

9. A method for the control of a project as recited in claim 8, further comprising:

redistributing resources to said external elements having the most late variance values, producing a product by applying resources to transform an article from an initial state to a different state.

10. A method for the control of a project as recited in claim 8, further comprising:

comparing by said secondary computer of updated revisions of variance values of said external elements for said activity to said activity variance goal for said activity received from said primary computer, displaying by said secondary computer of updated revisions to variance values that are more late than said activity variance goal for said activity.

11. A method for the operation of a project control computer, comprising:

entering into said project control computer the following inputs: a list of activities in said project, interdependencies of the time sequence of said activities, time duration estimates of said activities, and a desired completion date, calculating in said project control computer a baseline schedule date for the start of each said activity, said baseline schedule date for the start of each activity being equal to the baseline schedule date for the start of the following activity minus said estimated time duration of said activity, said desired completion date being the last baseline schedule date in said network, storing said baseline schedule dates, transmitting said baseline schedule date for each activity to each of a plurality of secondary computers, receiving from said secondary computers a most late variance value for each activity, storing in said project control computer said most late variance values for each activity received from said secondary computers, determining the latest variance value from amongst all most late variance values received from said secondary computers, transmitting an activity variance goal for each activity to said secondary computers.

12. A method for the operation of a secondary project control computer, comprising:

entering into and storing in said secondary computer the following inputs: designations of external elements required to start an activity, the availability date for each of said external elements, and a baseline schedule date for the start of said activity, calculating, in said secondary computer, a variance value for each of said external elements, said variance value being equal to the amount of lateness of said availability date with respect to said baseline schedule date for said activity, determining and storing in said secondary computer the most late variance value, displaying said most late variance value, transmitting said most late variance value from said secondary computer to a project control computer, receiving from said project control computer an activity variance goal for said activity, storing in said secondary computer said activity variance goal for said activity received from said project control computer, identifying and displaying said external elements having variance values more late than said activity variance goal.

13. A secondary computer, comprising:

means for receiving a computer readable data signal containing a baseline schedule date for the start of an activity in a network of activities, said baseline schedule date for the start of each activity being equal to the baseline schedule date for the start of the following activity minus an estimated time duration of said activity, a desired completion date being the last baseline schedule date in said network, means for receiving also receiving a computer readable data signal containing an activity variance goal for activity, means for storing said baseline schedule date and said activity variance goal for said activity, means for entering a selection of said activity into said secondary computer, means for displaying said baseline schedule date in response to said selection and activity variance goal.

14. A secondary computer as recited in claim 13, wherein computer readable data signal is a broadcast signal.

15. A secondary computer as recited in claim 13, wherein said secondary computer is sufficiently small to be held in the human hand and operated while held in said hand.

16. A program storage device readable by a machine, embodying a program of instructions executable by said machine to perform method steps, comprising:

receiving into and storing in said machine the following inputs: a list of activities in a network, interdependencies of the time sequence of said activities, time duration estimates of said activities, and a desired completion date, calculating in said machine a baseline schedule date for the start of each said activity, said baseline schedule date for the start of each activity being equal to the baseline schedule date for the start of the following activity minus said estimated time duration of said activity, said desired completion date being the last baseline schedule date in said network, storing in said machine said baseline schedule dates, transmitting from said machine said baseline schedule dates to a plurality of secondary machines, receiving from said secondary machines a most late variance value for an activity, storing in said machine said most late variance values received from said secondary machines, determining the latest variance value from amongst all most late variance values received from said secondary machines and displaying said latest variance value, transmitting an activity variance goal for each activity to said secondary machines.

17. A program storage device readable by a machine, embodying a program of instructions executable bad said machine to perform method steps as recited in claim 16, further comprising:

transmitting an additional cost threshold for satisfying said activity variance goal for said activity.

* * * * *